United States Patent [19]
Nakacho et al.

[11] Patent Number: 6,143,845
[45] Date of Patent: Nov. 7, 2000

[54] PROCESS FOR PRODUCING POLYOLEFIN

[75] Inventors: Kenji Nakacho, Ichihara; Yutaka Takakura, Sodegaura; Hideo Funabashi, Ichihara, all of Japan

[73] Assignee: Idemitsu Petrochemical Co., Ltd., Tokyo, Japan

[21] Appl. No.: 08/211,541

[22] PCT Filed: Aug. 26, 1992

[86] PCT No.: PCT/JP92/01071

§ 371 Date: Jul. 26, 1994

§ 102(e) Date: Jul. 26, 1994

[87] PCT Pub. No.: WO94/04578

PCT Pub. Date: Mar. 3, 1994

[51] Int. Cl.[7] .................................................. C08F 4/52
[52] U.S. Cl. .................................. 526/124.7; 526/124.2; 526/160; 526/943
[58] Field of Search ............................. 526/124, 124.2, 526/124.7, 160

[56] References Cited

U.S. PATENT DOCUMENTS

| | | | |
|---|---|---|---|
| 3,242,099 | 3/1966 | Manyik et al. | 526/153 |
| 4,250,284 | 2/1981 | Delbouille et al. | 526/132 |
| 4,414,132 | 11/1983 | Goodall et al. | 526/125 |
| 5,032,562 | 7/1991 | Lo et al. | 502/113 |
| 5,106,804 | 4/1992 | Bailly et al. | 526/125 |
| 5,139,985 | 8/1992 | Barbe et al. | 526/125 |

FOREIGN PATENT DOCUMENTS

| | | | |
|---|---|---|---|
| 0 239 475 | 9/1987 | European Pat. Off. . | |
| 130604 | 7/1985 | Japan | 526/153 |
| 61-141708 | 6/1986 | Japan | 526/124.2 |
| 63-168407 | 7/1988 | Japan | 526/153 |
| 2-22307 | 1/1990 | Japan . | |
| 2-189305 | 7/1990 | Japan | 526/124 |
| 1464909 | 2/1977 | United Kingdom | 526/124 |

OTHER PUBLICATIONS

Translation of Japan 2–189305, Jul. 1990.
Tsutsui—Translation of Japan 2–22307, Jan. 1990.

*Primary Examiner*—David W. Wu
*Assistant Examiner*—Roberto Rabago
*Attorney, Agent, or Firm*—Oblon, Spivak, McClelland, Maier & Neustadt, P.C.

[57] ABSTRACT

There is disclosed a process for producing a polyolefin which comprises polymerizing an olefin by the use of a catalyst comprising a specific transition metal compound, an aluminoxane and a specific magnesium compound or a catalyst comprising a specific transition metal compound, an aluminoxane, a specific magnesium compound and an organoaluminum compound. The use of the above process in polymerizing the olefin enables efficient stable production of a high molecular weight polyolefin improved in the powder morphology of the produced polymer, facilitated in the regulation of the molecular weight distribution and gifted with excellent particle shape.

10 Claims, No Drawings

PROCESS FOR PRODUCING POLYOLEFIN

TECHNICAL FIELD

The present invention relates to a process for producing a polyolefin. More particularly, it pertains to a process for producing a polyolefin capable of enhancing the powder morphology of the resultant polymer and facilitating the regulation of the molecular weight distribution of the polymer, a process for efficiently producing in a stable manner a high-molecular weight polyolefin having excellent particle shapes, and a process for efficiently producing a polyolefin characterized by any of the aforestated process by the use of a catalyst enhanced in polymerization activity.

BACKGROUND ART

There has heretofore been known a process for producing a polyolefin by the use of a solid titanium-based catalyst and an organoaluminum compound. However, the polyolefin produced by the above-mentioned process generally has involved the problem that its transparency is poor when formed into films because of its being broad in the molecular weight distribution and compositional distribution.

On the other hand, there has recently been proposed a homogeneous catalyst having high activity and capable of producing a polymer with narrow molecular-weight distribution, which catalyst is exemplified by a catalyst composed of a metallocene compound of a transition metal and an aluminoxane. (Refer to Japanese Patent Application Laid-Open No. 19303/1983). Nevertheless, the aforesaid process for producing a polyolefin by the use of the above-mentioned homogeneous catalyst involves the problems that (1) the resultant polymer dissolves in a solvent or becomes gel, thereby making it difficult to separate the polymer from the solvent, (2) The polymer is likely to adhere to a reaction vessel and (3) a high-molecular weight polymer is difficult to produce.

There is proposed, as a process for producing a high-molecular weight polymer, a method in which a homogeneous catalyst composed of an oxygen-containing titanium compound and an aluminoxane is employed. (Refer to Japanese Patent Application Laid-Open No.3008/1988). However, the above-mentioned process suffers the disadvantage that the formed polymer adheres to a polymerization reactor, thus making it difficult to proceed with the reaction in a stable manner.

As a means for regulating the molecular weight distribution in the case of a homogeneous catalyst being used, there are proposed (1) a method in which at least two kinds of metallocene compounds are employed (Japanese Patent Application Laid-Open Nos. 35006/1985 and 35008/1985) and (2) a method in which polymerization is carried out at a specific temperature by the use of a hafnocene compound (Japanese Patent Application Laid-Open No. 75605/1990). However, any of the aforesaid methods suffers the disadvantage that the operation is troublesome or only a specific condition is utilizable for the method.

On the other hand, there is proposed a technique by using a solid substance which is obtained by allowing a homogeneous catalyst to be supported on an inorganic oxide carrier (Japanese Patent Application Laid-Open No. 108610/1985). Nevertheless, the above-proposed technique involves the problems of low activity of the catalyst per unit amount of the carrier and frequent occurrence of film gelling due to the carrier remaining in the polymer. There is also disclosed a catalyst composed of a non-metallocene transition metal compound and an aluminoxane that are supported on silica (Japanese Patent Application Laid-Open No. 503715/1989 through PCT). However, the above-mentioned catalyst involves the problem of low polymerization-activity in spite of a high-molecular weight of the polymer to be obtained.

DISCLOSURE OF THE INVENTION

Under such circumstances, intensive research and investigation were made by the present inventors in order to develop a process for producing a polyolefin capable of enhancing the powder morphology of the resultant polymer and facilitating the regulation of the molecular weight distribution of the polymer, a process for efficiently producing in a stable manner a high-molecular weight polyolefin having excellent particle shapes, and process for efficiently producing a polyolefin characterized by any of the above-mentioned process by the use of a catalyst enhanced in polymerization activity.

As a result, it has been found by the present inventors that the foregoing objects are attained by the use of the catalyst comprising a specific transition-metal compound, an aluminoxane and a specific magnesium compound or the catalyst further comprising an organoaluminum compound in addition thereto. The present invention has been accomplished on the basis of the above-mentioned finding and information.

Specifically, the first aspect of the present invention provides a process for producing a polyolefin which comprises polymerizing an olefin by the use of a catalyst comprising (A) a transition metal compound having a group with conjugated π electron as a ligand, (B) an aluminoxane and (C) a magnesium compound represented by the general formula $$MG(OR)_n X^1_{2-n} \qquad (I)$$

wherein R is an alkyl group, a cycloalkyl group, an aryl group or an aralkyl group; $X^1$ is a halogen atom; and n is a number from 1 to 2, the second aspect thereof provides a process for producing a polyolefin which comprises polymerizing an olefin by the use of a catalyst comprising the above-mentioned components (A), (B), (C) and (D) an organoaluminum compound, the third aspect thereof provides a process for producing a polyolefin which comprises polymerizing an olefin by the use of a catalyst comprising (E) a transition metal compound represented by the general formula $$M^1 R^1_a R^2_b R^3_c R^4_d \qquad (II)$$

wherein $M^1$ is a transition metal belonging to the group IVB in the Periodic table; $R^1$, $R^2$, $R^3$ and $R^4$ are each a σ-bonding ligand, a chelating ligand or a Lewis base and may be the same or different from each other; and a, b, c and d are each an integer from 1 to 4, and the aforesaid components (B) and (C), and the fourth aspects thereof provides a process for producing as polyolefin which comprises polymerizing an olefin by the use of a catalyst comprising the aforesaid components (E), (B), (C) and (D).

THE MOST PREFERRED EMBODIMENT TO CARRY OUT THE INVENTION

In the first aspect of the present invention, there is used as the catalyst the composition comprising the above-mentioned components (A), (B) and (C). The transition metal compound having a group with conjugated π electron as a ligand, that is, the component (A) is exemplified by the compound represented by the general formula (III), (IV) or (V) and a derivative thereof.

$$CpM^2R^5_e R^6_f R^7_g \quad (III)$$

$$Cp_2 M^2 R_e^5 R_f^6 \quad (IV)$$

$$(Cp\text{-}Ah\text{-}Cp)M^2 R_e^5 R_f^6 \quad (V)$$

wherein $M^2$ is a transition metal belonging to the group IVB of the Periodic Table such as a Ti atom, Zr atom or Hf atom; Cp is an unsaturated cyclic hydrocarbon radical or an unsaturated chain hydrocarbon radical such as cyclopentadienyl group, substituted cyclopentadienyl group, indenyl group, substituted indenyl group, tetrahydroindenyl group, substituted tetrahydroindenyl group, fluorenyl group or substituted fluorenyl group; $R^5$, $R^6$ and $R^7$, independently of one another, are each a ligand such as a σ-bonding ligand, a chelating ligand and a Lewis base, specifically exemplified as a σ-bonding ligand by a hydrogen atom, an oxygen atom, a halogen atom, an alkyl group having 1 to 20 carbon atoms, an alkoxy group having 1 to 20 carbon atoms, an aryl group, an alkylaryl group, an arylalkyl group each having 6 to 20 carbon atoms, an acyloxy group having 1 to 20 carbon atoms, an allyl group, a substituted allyl group and a substituent containing a silicon atom and, as a chelating ligand, by an acetylacetonato group and a substituted acetylacetonato group; A is crosslinkage by covalent bond; e, f and g, independently of one another, are each an integer from 0 to 4; h is an integer from 0 to 6; at least two out of $R^5$, $R^6$ and $R^7$ may together form a ring; and when Cp has a substituent, the substituent is preferably an alkyl group having 1 to 20 carbon atoms.

Examples of the substituted cyclopentadienyl group in the above-mentioned formulae (III) to (V) include methylcyclopentadienyl group; ethylcyclopentadienyl group; isopropylcyclopentadienyl group; 1,2-dimethylcyclopentadienyl group; tetramethylcyclopentadienyl group; 1,3-dimethylcyclopentadienyl group; 1,2,3-trimethylcyclopentadienyl group; 1,2,4-trimethylcyclopentadienyl group; pentamethylcyclopentadienyl group and trimethylsilylcyclopentadienyl group. Specific examples of $R^5$ to $R^7$ in the aforesaid formulae (III) to (V) include fluorine atom, chlorine atom, bromine atom and iodine atom as halogen atom; methyl, ethyl, n-propyl, isopropyl, n-butyl, octyl and 2-ethylhexyl group as alkyl group having 1 to 20 carbon atoms; methoxy, ethoxy, propoxy, butoxy and phenoxy group as alkoxy group having 1 to 20 carbon atoms; phenyl, tolyl, xylyl and benzyl group as aryl, alkylaryl or arylalkyl group each having 6 to 20 carbon atoms; heptadecylcarbonyloxy group as acyloxy group having 1 to 20 carbon atoms; trimethylsilyl and (trimethylsilyl)methyl group as substituent containing silicon atom; as Lewis base, ethers such as dimethyl ether, diethyl ether and tetrahydrofuran; thioethers such as tetrahydrothiophene; esters such as ethylbenzoate; nitriles such as acetonitrile and benzonitrile; amines such as trimethylamine, triethylamine, tributylamine, N,N-dimethylaniline, pyridine, 2,2'-bipyridine and phenanthroline; phosphine such as triethylphosphine and triphenylphosphine; unsaturated chain hydrocarbon such as ethylene, butadiene, 1-pentene, isoprene, pentadiene, 1-hexene and derivatives thereof; unsaturated cyclic hydrocarbon such as benzene, toluene, xylene, cycloheptatriene, cyclooctadiene, cyclooctatriene, cyclooctatetraene and derivatives thereof. Examples of A, that is, crosslinkage by covalent bond in the above formula (V) include methylene, dimethylmethylene, ethylene, 1,1'-cyclohexylene, dimethylsilylene, dimethylgermylene and dimethylstannylene crosslinkage.

Specific examples of the compound represented by the general formula (III) include pentamethylcyclopentadienyltrimethyltitanium, pentamethylcyclopentadienyltriphenyltitanium, pentamethylcyclopentadienyltribenzyltitanium, pentamethylcyclopentadienyltrichlorotitanium, pentamethylcyclopentadienyltrimethoxytitanium, cyclopentadienyltrimethyltitanium, cyclopentadienyltriphenyltitanium, cyclopentadienyltribenzyltitanium, cyclopentadienyltrichlorotitanium, cyclopentadienyltrimethoxytitanium, cyclopentadienyldimethylmethoxytitanium, methylcyclopentadienyltrimethyltitanium, methylcyclopentadienyltriphenyltitanium methylcyclopentadienyltribenzyltitanium, methylcyclopenadienyltrichlorotitanium, methylcyclopentadienyldimethylmethoxytitanium, dimethylcyclopentadienyltrichlorotitanium, trimethylcyclopentadienyltrichlorotitanium, trimethylcyclopentadienyltrimethyltitanium, tetramethylcyclopentadienyltrichlorotitanium, and any of the above-exemplified compounds in which the titanium atom is replaced with a zirconium or a hafnium atom.

Specific examples of the compound represented by the general formula (IV) include bis(cyclopentadienyl) dimethyltitanium; bis(cyclopentadienyl)diphenyltitanium; bis(cyclopentadienyl)diethyltitanium; bis(cyclopentadienyl) dibenzyltitanium; bis(cyclopentadienyl)dimethoxytitanium; bis(cyclopentadienyl)dichlorotitanium; bis (cyclopentadienyl)dihydridotitanium; bis(cyclopentadienyl) monochlorohydridotitanium; bis(methylcyclopentadienyl) dimethyltitanium; bis(methylcyclopentadienyl) dichlorotitanium; bis(methylcyclopentadienyl) dibenzyltitanium; bis(pentamethylcyclopentadienyl) dimethyltitanium; bis(pentamethylcyclopentadienyl) dichlorotitanium; bis(pentamethylcyclopentadienyl) dibenzyltitanium; bis(pentamethylcyclopentadienyl) chloromethyltitanium; bis(pentamethylcyclopentadienyl) hydridomethyltitanium; (cyclopentadienyl) (pentamethylcyclopentadienyl)-dichlorotitanium; and any of the above-mentioned compounds in which the titanium atom is replaced with a zirconium or a hafnium atom.

Specific examples of the compound represented by the formula (V) include ethylenebis(indenyl)dimethyltitanium; ethylenebis(indenyl)dichlorotitanium; ethylenebis (tetrahydroindenyl)dimethyltitanium; ethylenebis (tetrahydroindenyl)dichlorotitanium; dimethylsilylenebis (cyclopentadienyl)dimethyltitanium; dimethylsilylenebis (cyclopentadienyl)dichlorotitanium; isopropylidene (cyclopentadienyl)(9-fluorenyl) dimethyltitanium; isopropylidene(cyclopentadienyl)(9-fluorenyl) dichlorotitanium; [phenyl(methyl)methylene](9-fluorenyl) (cyclopentadienyl) dimethyltitanium; diphenylmethylene (cyclopentadienyl)(9-fluorenyl) dimethyltitanium; ethylene (9-fluorenyl)(cyclopentadienyl)dimethyltitanium; cyclohexalidene(9-fluorenyl)(cyclopentadienyl) dimethyltitanium; cyclopentylidene(9-fluorenyl)(cyclopentadienyl) dimethyltitanium; cyclobutylidene(9-fluorenyl) (cyclopentadienyl) dimethyltitanium; dimethylsilylene(9-fluorenyl)(cyclopentadienyl) dimethyltitanium; dimethylsilylenebis(2,3,5-trimethylcyclopentadienyl) dichlorotitanium; dimethylsilylenebis(2,3,5-trimethylcyclopentadienyl) dimethyltitanium; dimethylsilylenebis(indenyl)dichlorotitanium; any of the above-mentioned compounds in which the titanium atom is replaced with a zirconium or a hafnium atom.

Favorably usable titanium compound as the component (A) among those represented by the general formula (V) is a transition metal compound having a multidentate ligand in which two substituted or unsubstituted conjugated cyclopentadienyl groups (at least one being substituted cyclopentadienyl group) are bonded to one another via an element selected from the group IVA of the Periodic Table. By the use of such a compound, an isotactic polyolefin having enhanced isotacticity, a high molecular weight and a high melting point is obtained.

Examples of such compound include the compound represented by the general formula (VI) and derivatives thereof

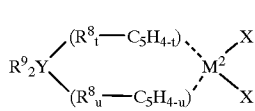

(VI)

wherein $M^2$ is a transition metal belonging to the group IV B of the Periodic Table, Y is a carbon atom, silicon atom, germanium atom or tin atom; $R^8{}_t\text{—}C_5H_{4-t}$ and $R^8{}_u\text{—}C_5H_{4-u}$ are each a substituted cyclopentadienyl group in which t and u are each an integer from 1 to 4; $R^8$ is a hydrogen atom, silyl group or hydrocarbon radical, and may be the same or different, provided that at least one cyclopentadienyl group has $R^8$ on at least one carbon atom adjacent to the carbon atom bonded to Y; $R^9$ is a hydrogen atom, an alkyl group having 1 to 20 carbon atoms, an aryl group, an alkylaryl group or an arylalkyl group each having 6 to 20 carbon atoms; X is a hydrogen atom, a halogen atom, an alkyl group having 1 to 20 carbon atoms, an aryl group, an alkylaryl group or an arylalkyl group each having 6 to 20 carbon atoms or an alkoxyl group having 1 to 20 carbon atoms and may be the same or different.

Examples of the substituted cyclopentadienyl group in the above-mentioned formula (VI) include methylcyclopentadienyl group; ethylcyclopentadienyl group; isopropylcyclopentadienyl group; 1,2-dimethylcyclopentadienyl group; 1,3-dimethylcyclopentadienyl group; 1,2,3-trimethylcyclopentadienyl group; and 1,2,4-trimethylcyclopentadienyl group. Specific examples of X include F, Cl, Br and I as halogen atom; methyl, ethyl n-propyl, isopropyl, n-butyl, octyl and 2-ethylhexyl group as alkyl group having 1 to 20 carbon atoms; methoxy, ethoxy, propoxy, butoxy and phenoxy group as alkoxy group having 1 to 20 carbon atoms; phenyl, tolyl, xylyl and benzyl group as aryl, alkylaryl or arylalkyl group each having 6 to 20 carbon atoms.

Specific Examples of $R^9$ include methyl, ethyl, phenyl, tolyl, xylyl and benzyl group.

Examples of the compounds represented by the general formula (VI) include dimethylsilylenebis(2,3,5-trimethylcyclopentadienyl)titanium dichloride and the compound in which a titanium atom is replaced with a zirconium atom or a hafnium atom.

In the present invention, the transition metal compound may be employed alone or in combination with at least one other transition metal compound.

In the above-mentioned catalyst, an aluminoxane is used as the component (B), and there are usable the previously known aluminoxanes. Preferable examples thereof include a cyclic aluminoxane represented by the general formula (VII)

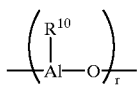

(VII)

wherein $R^{10}$ is a hydrocarbon radical having 1 to 8 carbon atoms and r is an integer from 2 to 100, and a chain aluminoxane represented by the general formula (VIII)

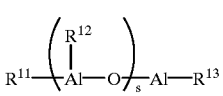

(VIII)

wherein $R^{11}$, $R^{12}$ and $R^{13}$, independently of one another, are each a hydrocarbon radical having 1 to 8 carbon atoms and S is an integer from 2 to 100.

Preferable examples of $R^{10}$, $R^{11}$, $R^{12}$ and $R^{13}$ include an alkyl group such as methyl group, ethyl group and isobutyl group, and r and s are each preferably 7 to 40. The alumioxane as the component (B) in the catalyst may be employed alone or in combination with at least one other aluminoxane.

Moreover in the above-mentioned catalyst, there is used as the component (C), a magnesium compound represented by the general formula (I)

$$Mg(OR)_n X^1{}_{2-n} \qquad \text{(I)}$$

wherein R, $X^1$ and n are each as previously defined. Preferable examples of the aforementioned magnesium compound include dimethoxymagnesium, diethoxymagnesium, di-n-propoxymagnesium, diphenoxymagnesium, dibenzyloxymagnesium, ethoxyphenoxymagnesium, chloromethoxymagnesium and chloroethoxymagnesium. The above-exemplified magnesium compound may be employed alone or in combination with at least one other magnesium compound.

As the magnesium compound represented by the foregoing general-formula (I), there is usable the reaction product among metallic magnesium, an alcohol and an halogen. The metallic magnesium to be employed in the reaction is not specifically limited with regard to its shape, but may be in any shape including granule, ribbon and powder. Likewise, the surface condition of the metallic magnesium is not specifically limited, but is preferably free from any coating such as magnesium oxide formed on the surface.

The alcohol to be employed in the reaction is not specifically limited with respect to its kind, but is preferably a lower alcohol having 1 to 6 carbon atoms, especially ethanol because of its capability of providing solid catalyst component which enhances the catalytic performance. There is no particular limitation to the purity and water content of the alcohol. However, the water content in the alcohol is desirably 1% by weight or less, more desirably 2,000 ppm or less, particularly desirably as low as possible, since the use of an alcohol having a high water content will lead to the formation of magnesium hydroxide on the surface of the metallic magnesium.

The usable halogen and/or halogen-containing compound are not specifically limited in regard to its kind, but may be any compound provided that the chemical formula thereof has a halogen atom. In this case, the halogen atom is not specifically limited in its kind, but is preferably a chlorine atom, a bromine atom or an iodine atom. Among the hologen-containing compounds, a halogen-containing metallic compound is particularly desirable.

Specific examples of the halogen-containing compound include $MgCl_2$, $MgI_2$, $Mg(OC_2H_5)Cl$, $Mg(OC_2H_5)I$, $MgBr_2$, $CaCl_2$, $NaCl$ and $KBr$, among which $MgCl$ and $MgI_2$ are particularly desirable.

The halogen-containing compounds are not specifically limited with regard to the condition, shape and particle size, but may be in an arbitrary form, for example, a solution thereof in an alcohol-based solvent such as ethanol.

The amount of the alcohol to be used in the reaction is usually in the range of 2 to 100 moles, preferably 5 to 50 moles per one mole of the metallic magnesium. An excessively large amount of alcohol to be used is apt to cause difficulty in providing a magnesium compound having a favorable morphology, whereas the use of a too small amount thereof results in a possible failure to smoothly react with the metallic magnesium. On the other hand, the amount of the halogen and/or halogen-containing compound to be used in the reaction is usually 0.0001 g-atom or more, desirably 0.0005 g-atom or more, more desirably 0.001 g-atom or more per one mole of the metallic magnesium. An amount of the halogen and/or halogen-containing compound to be used less than 0.0001 g-atom brings about deterioration of the amount of titanium to be supported, catalyst activity and the stereoregularity of the polymer to be formed when the magnesium compound thus obtained is used as such without being crushed. The result is unfavorable, since the crushing of the magnesium compound is indispensably needed. The upper limit of the amount of the halogen and/or halogen-containing compound to be used is not specifically limited, but may be suitably selected in the range which enables the production of the desired magnesium compound. A suitable selection of the above-mentioned amount of the halogen and/or halogen-containing compound to be used make it possible to arbitrarily control the particle size of the magnesium compound to be produced.

The reaction among the metallic magnesium, the alcohol and the halogen and/or halogen-containing compound can be put into practice by using a conventional process, for example, a process in which the metallic magnesium, the alcohol and the halogen are reacted with each other under reflux usually for 2 to 30 hours until the generation of hydrogen gas is no longer observed, thus producing the desired magnesium product. Specifically usable process is exemplified by a process wherein solid iodine is used as the halogen and poured in a mixture of metallic magnesium and an alcohol, followed by heating with reflux, a process wherein a solution of iodine in an alcohol is added dropwise to a mixture of metallic magnesium and an alcohol, followed by heating with reflux, and a process wherein a solution of iodine in an alcohol is added dropwise to a mixture of metallic magnesium and an alcohol while being heated. In any of the above-mentioned processes, it is preferable that the reaction be put into practice in an atmosphere of an inert gas such as nitrogen gas and argon gas and, as the case may be, by the use of an inert organic solvent such as a saturated hydrocarbon exemplified by n-hexane. There is no need to place the total amounts of both the metallic magnesium and the alcohol in a reaction vessel at the start of the reaction, but each of them may be dividedly placed therein, for example, by a method in which the total amount of the alcohol is placed at the start of the reaction, followed by the addition of the metallic magnesium dividedly into several times. The method is extremely desirable from the viewpoint of safety, since the sudden generation of a large amount of hydrogen gas is prevented thereby, and further it is advantageous in that it can miniaturize a reaction vessel and prevent the entrainment of the alcohol and halogen caused by the sudden generation of a large amount of hydrogen gas. The number of times of divided addition may be determined taking into consideration the scale and size of the reaction vessel without specifical limitation, but is usually selected in the range of 5 to 10 times in view of the tediousness in the operation.

The reaction system may be any of batchwise and continuous systems or a modified system in which a small amount of metallic magnesium is placed in the alcohol which has been put in a reaction vessel in a whole amount in advance, the reaction product is removed by separating into another vessel, a small amount of metallic magnesium is again placed in the remaining alcohol, and the above-mentioned procedures are repeated.

The magnesium compound thus obtained can be used in the subsequent step with crushing or classification procedure for the purpose of uniformizing particle size.

By the use of the catalyst which comprises the aforestated components (A), (B) and (C), it is possible to contrive to improve the powder morphology of the polymer to be produced and facilitate the regulation of the molecular weight distribution of the polymer.

In the second aspect of the present invention, there is employed the catalyst composition which comprises an organoaluminum compound as the component (D) in addition to the components of the catalyst in the aforestated first aspect of the present invention. The combination of the organoaluminum compound can enhance the polymerization activity in addition to the above-mentioned properties.

Examples of the organoaluminum compound include the compound represented by the general formula (IX)

$$R^{14}{}_m AlX^2{}_{3-m} \tag{IX}$$

wherein $R^{14}$ is an alkyl group having 1 to 20 carbon atoms or an aryl group having 6 to 20 carbon atoms, $X^2$ is a halogen atom, an alkoxy group having 1 to 20 carbon atoms or an aryloxy group having 6 to 20 carbon atoms and m is a real number greater than 0 and not greater than 3. Specific examples of such organoaluminum compound include trimethylaluminum, triethylaluminum triisobutylaluminum, tri-n-butylaluminum, tri-n-hexylaluminum, tri-n-octyl-aluminum, triisopropylaluminum, diethylaluminum ethoxide, diisobutylaluminum ethoxide, diethylaluminum chloride and ethylaluminum dichloride. The preferable compound among them is a trialkylaluminum represented by the general formula (X)

$$AlR^{15}R^{16}R^{17} \tag{X}$$

wherein $R^{15}$, $R^{16}$ and $R^{17}$ are each an alkyl group having 1 to 20 carbon atoms and may be the same or different from one another. The organoaluminum compound may be used alone or in combination with at least one of the other ones.

Next, in the third aspect of the present invention, there is employed the catalyst composition which comprises the above-mentioned components (E), (B) and (C). The transition metal compound as the component (E) is represented by the general formula (II)

$$M^1 R^1{}_a R^2{}_b R^3{}_c R^4{}_d \tag{II}$$

wherein $M^1$, $R^1$, $R^2$, $R^3$, $R^4$, a, b, c, and d are each as previously defined. In the general formula (II), $M^1$ is a transition metal belonging to the group IVB of the Periodic Table such as Ti atom, Zr atom or Hf atom; $R^1$, $R^2$, $R^3$ and $R^4$, independently of one another, are each a σ-bonding ligand, a chelating ligand or a Lewis base, specifically exemplified as a σ-bonding ligand by a hydrogen atom, an oxygen atom, a halogen atom, an alkyl group having 1 to 20 carbon atoms, an alkoxy group having 1 to 20 carbon atoms, an aryl group, an alkylaryl group, an arylalkyl group each having 6 to 20 carbon atoms, an acyloxy group having 1 to 20 carbon atoms, a substituted allyl group and a substituent containing a silicon atom and, as a chelating ligand, by an acetylacetonato group and a substituted acetylacetonato group; at least two out of $R^1$, $R^2$, $R^3$ and $R^4$ may together form a ring; and a, b, c and d, independently of one another, are each an integer from 0 to 4.

Specific examples of the compound represented by the general formula (II) include tetramethyltitanium, tetrabenzyltitanium, tetramethoxytitanium, tetraethoxytitanium, tetrapropoxytitanium, tetrabutoxytitanium, titanium tetrachloride, titanium tetrabromide, butoxytitanium trichloride, butoxytitanium dichloride, bis(2,6-di-tert-butylphenoxy)dimethyltitanium, bis(2,6-di-tert-butylphenoxy)titanium dichloride, titanium bis(acetylacetonato), bis(acetylacetonato)titanium dichloride, bis(acetylacetonato)titanium dipropoxide and any of the above-mentioned compound in which titanium atom is replaced with a zirconium or a hafnium atom. The above-mentioned transition compound may be used alone or in combination with at least one of other ones.

The components (B) and (C) as described in the first aspect of the present invention can be used as the component (B) and (C), respectively in the above-described catalyst.

The use of the catalyst comprising the aforesaid components (E), (B) and (C) enables a high molecular weight polyolefin excellent in particle morphology to be efficiently produced in a stable manner with minimized adhesion of the produced polymer to a polymerization reactor.

Next, in the fourth aspect of the present invention, there is employed the catalyst composition which comprises an organoaluminum compound as the component (D) in addition to the components of the catalyst in the aforestated third aspect of the present invention. The combination of the organoaluminum compound can enhance the polymerization activity in addition to the above-mentioned properties.

The component (D) as described in the second aspect of the present invention can be used as the component (D) in the catalyst of the fourth aspect thereof.

The amount of each of the components to be used in each catalyst is not specifically limited, but may be suitably selected according to the situation. It is usually selected so that the amount of the component (A) or (E) is 10 to one (1) mole, preferably $10^{-3}$ to $10^{-1}$ mole per mole of the component (C), the amount of the component (B) is one (1) to $10^6$ moles, preferably 10 to $10^5$ moles per mole of the component (A) or (E) expressed in terms of aluminum atom, and the amount of the component (D) is $10^{-1}$ to $10^5$ moles preferably one (1) to $10^4$ moles per mole of the component (A) or (E).

The order of bringing each of the components of the catalyst into contact with each other is not specifically limited, but may be arbitrarily selected. The reaction product after contact treatment may be used as such, or cleaned with an inert solvent prior to using, or distilled to distill away the preparation solvent and dispersed in another solvent, followed by using.

Examples of the inert solvent to be used in bringing each component into contact with one another include aliphatic hydrocarbons each having 5 to 18 carbon atoms, alicyclic hydrocarbons and aromatic hydrocarbons, which are specifically enumerated by n-pentate, isopentane, hexane, heptane, octane, nonane, decane, tetradecane, cyclohexane, benzene, toluene and xylene. Any of the above-enumerated solvents may be used alone or as a mixture with at least one other one. The contact temperature and reaction time are not specifically limited.

The contact treatment may be carried out in a manner similar to preliminary polymerization in the presence of a small amount of a monomer, or under the condition including a remarkably low rate of polymerization reaction.

The contact-treated product thus prepared can be preserved in an atmosphere of an inert gas.

There is usable in the present invention, an arbitrary olefin as the monomer such as an α-olefin and a cyclic olefin, which are enumerated as α-olefin, ethylene, propylene, 1-butene, 1-hexene, 1-octene and 1-decene, and as cyclic olefin, cyclobutene, cyclopentene, cyclohexene, cycloheptene and cyclooctene. In the present invention, an olefin can be copolymerized with an unsaturated monomer component other than olefin which component is copolymerizable with the olefin.

The process according to the present invention is particularly preferably applicable to the production of an ethylenic polymer. In this case, ethylene may be homopolymerized or copolymerized with an α-olefin other than ethylene or a diene compound. Examples of such α-olefin include straight-chain or branched monoolefin having 3 to 18 carbon atoms and α-olefin replaced with an aromatic group. Specific examples of such α-olefin include straight-chain monoolefin such as propylene; butene-1; hexene-1; octene-1; nonene-1; decene-1; undecene-1; and dodecene-1, branched monoolefin such as 3-methylbutene-1; 3-methylpentene-1; 4-methylpentene-1; 2-ethylhexene-1; and 2,2,4-trimethylpentene-1 and monoolefin replaced with a benzene ring such as styrene.

Examples of the preferable diene compound include a straight chain or branched non-conjugated diolefin such as 1,5-hexadiene; 1,6-heptadiene; 1,7-octadiene; 1,8-nonadiene; 1,9-decadiene; 2,5-dimethyl-1,5-hexadiene; and 1,4-dimethyl-4-tert-butyl-2,6-heptadiene, polyene such as 1,5,9-decatriene and end-methylene series cyclic diene such as 5-vinyl-2-norbornene.

The polymerization method in the present invention is not specifically limited, but is usually any of slurry, hot solution, gas-phase or bulk polymerization method, etc. As the polymerization solvent, an inert solvent such as an aliphatic hydrocarbon, an alicyclic hydrocarbon or an aromatic hydrocarbon is employed, among which is preferable an aliphatic hydrocarbon exemplified by hexane and heptane.

It is preferable that the amount of the polymerization catalyst to be used be selected in the range of $10^{-8}$ to $10^{-2}$ mole/liter, preferably $10^{-7}$ to $10^{-3}$ mole/liter expressed in terms of the atoms of the transition metal belonging to the group IVB of the Periodic Table.

The polymerization temperature is not specifically limited, but is usually selected in the range of 0 to 350° C., preferably 20 to 250° C. On the other hand, the polymerization pressure is not specifically limited as well, but is usually selected in the range of 0 to 150 kg/cm²G, preferably 0 to 100 kg/cm²G.

The modification of the molecular weight and the molecular weight distribution of the polyolefin to be produced can be carried out with case by adding hydrogen into the reaction system at the time of polymerization. The addition of hydrogen is effective particularly in the first and second aspects of the present invention.

In the following, the present invention will be described in more detail with reference to examples and comparative examples.

PREPARATION EXAMPLE 1

Preparation of Solution of Methylaluminoxane in Toluene

A solution of methylaluminoxane (produced by TOSOH AKUZO CORPORATION) in toluene was made into the form of thick malt syrup by reducing the pressure at room temperature. Subsequently, the pressure was further reduced at 90° C. for one (1) hour to produce methylaluminoxane crystal in solid form, which was then dispersed in toluene to prepare 1.9 mole/liter solution of methylalumioxane in toluene expressed in terms of Al atom.

PREPARATION EXAMPLE 2

Preparation of Dispersion Liquid of Methylalumioxane in Hexane

A solution of methylalumioxane (produced by Shelling Corporation) in toluene was made into the form of thick malt syrup by reducing the pressure at room temperature. Subsequently, the pressure was further reduced at 90° C. for one (1) hour to produce methylaluminoxane crystal in solid form, which was then dispersed in hexane to prepare 1.0 mole/liter dispersion liquid of methylaluminoxane in hexane expressed in terms of Al atom.

EXAMPLE 1

(1) Preparation of Solid Product

A 6 liter glass-made reactor equipped with a stirrer which had sufficiently been purged with nitrogen gas was charged with 2430 g of ethanol, 16 g of iodine and 160 g of metallic magnesium. The mixture in the reactor was allowed to react with stirring under heating and reflux condition until the generation of hydrogen gas was no longer observed to produce a reaction product in solid form. The reaction liquid containing the reaction product was dried under reduced pressure to afford a solid product.

(2) Preparation of Solid Catalyst Components

To 10 g of the solid product (62 $\mu$m average particle size) as produced in the preceding item (1) were added in turn a solution of 0.17 mmol of bis (cyclopentadienyl)zirconium dichloride in 50 ml of toluene and 1.9 mole/liter solution of methylaluminoxane in toluene in an amount of 35 mmol in terms of methylaluminoxane. The mixture was allowed to react at room temperature with gentle stirring for one hour. Then, the toluene solvent was removed by reducing the pressure with gentle stirring at room temperature. Subsequently heptane was added to the reaction system to form a slurry in a total amount of 400 ml. All of the aforesaid procedure was carried out in an atmosphere of dry nitrogen.

(3) Polymerization of Ethylene

A one (1) liter dry polymerization reactor equipped with a stirrer the inside of which had been purged with dry nitrogen was charged with 400 ml of dry heptane and further with 2.6 ml of solution of methylaluminoxane in toluene (1.9 mmol/liter) and 0.003 mmol of the solid catalyst component as prepared in the preceding item (2) expressed in terms of zirconium.

Subsequently the reaction system was heated to raise the temperature up to 80° C., charged with hydrogen so as to attain a hydrogen partial pressure of 0.06 kg/cm$^2$G and pressurized with ethylene so as to maintain the internal pressure in the polymerization reactor at 8 kg/cm$^2$G, and ethylene was further introduced therein so as to maintain the internal pressure at 8 kg/cm$^2$G to proceed with polymerization at 80° C. for one hour.

After the completion of polymerization, the reactor was opened and the resultant polymer slurry was poured in 2 liter of mixed liquid of methanol and hydrochloric acid. The polymer was filtered off, washed with methanol and dried at 80° C. under reduced pressure for 4 hours.

As the result, there was obtained 23.0 g of polymer powder with favorable fluidity at a polymerization activity of 84 kg/g-Zr, which polymer had an apparent bulk density of 0.17 g/ml, a weight-average molecular weight (Mw) of 46000 and a ratio of weight-average molecular weight(Mw) to number-average molecular weight(Mn)(Mw/Mn) of 4.9.

COMPARATIVE EXAMPLE 1

The procedure in Example 1 was repeated to polymerize ethylene except that 0.003 mmol of bis(cyclopentadienyl) zirconium dichloride expressed in terms of zirconium(Zr) and 1.3 ml of 1.9 mol/liter solution of methylaluminoxane in toluene were added to the reaction system at the time of polymerization without preparing a solid catalyst component, and hydrogen partial pressure was set to 0.10 kg/cm$^2$G.

As a result, 23.7 g of polymer was obtained in the form of agglomerate and had a Mw of 38000 and a Mw/Mn ratio of 2.6.

EXAMPLE 2

The procedure in Example 1 was repeated to polymerize ethylene except that the solid catalyst component in an amount of 0.0015 mmol expressed in terms of Zr and 1.3 ml of 1.9 mole/liter solution of methylaluminoxane in toluene were used and hydrogen was not added to the reaction system.

As a result, 22.4 g of polymer was obtained at a polymerization activity of 164 kg/g-Zr and had an apparent bulk density of 0.07 g/ml, a Mw of 220,000 and a Mw/Mn ratio of 2.6.

COMPARATIVE EXAMPLE 2

(1) Preparation of Catalyst Components

The procedure in Example 1 (2) was repeated to prepare catalyst components except that the solid product was not incorporated.

(2) Polymerization of Ethylene

The procedure in Example 2 was repeated to polymerize ethylene except that the catalyst components as prepared in the preceding item (1) were used in place of the solid catalyst components.

However, after an elapse of 25 minutes from the start of polymerization, the polymerization was discontinued because of impossibility of the temperature control. On opening the polymerization reactor, there was observed remarkable adhesion of the polymer to the inside wall of the reactor.

EXAMPLE 3

The procedure in Example 2 was repeated to polymerize ethylene except that 5.3 ml of 1.9 mole/liter solution of methylaluminoxane in toluene was used.

As a result, 32.0 g of polymer was obtained at a polymerization activity of 234 kg/g-Zr and had a Mw of 220,000 and a Mw/Mn ratio of 2.6.

EXAMPLE 4

(1) Preparation of Solid Catalyst Components

The procedure in Example 1 (2) was repeated to prepare solid catalyst components except that methylaluminoxane was not incorporated.

(2) Polymerization of Ethylene

The procedure in Example 3 was repeated to polymerize ethylene except that the solid catalyst components as prepared in the preceding item (1) were used in place of those in Example 3.

As a result, 25.3 g of polymer was obtained at a polymerization activity of 185 kg/g-Zr and had an intrinsic viscosity [η] of 3.1 dl/g.

EXAMPLE 5

(1) Preparation of Solid Catalyst Components

The procedure in Example 1 (2) was repeated to prepare solid catalyst components except that one (1) g of the solid product was used.

(2) Polymerization of Ethylene

The procedure in Example 3 was repeated to polymerize ethylene except that the solid catalyst components as prepared in the preceding item (1) were used in place of those in Example 3 and that the polymerization was carried out for 30 minutes.

As a result, 47.7 g of polymer was obtained at a polymerization activity of 349 kg/g-Zr and had an intrinsic viscosity [η] of 4.1 dl/g.

EXAMPLE 6

Ethylene was polymerized through preliminary polymerization.

A one (1) liter dry polymerization reactor equipped with a stirrer the inside of which had been purged with dry nitrogen was charged with 400 ml of dry heptane and further with 1.3 ml of solution of methylaluminoxane in toluene (1.9 mmol/liter) and 0.0015 mmol of the solid catalyst component as prepared in Example 1 (2) expressed in terms of zirconium. Then, 0.17 Nl of ethylene was introduced into the reactor to carry out preliminary polymerization at 17° C. for 30 minutes. Subsequently the reaction system was heated to raise the temperature up to 80° C. and pressurized with ethylene so as to maintain the internal pressure in the polymerization reactor at 8 kg/cm²G, and ethylene was further introduced therein so as to maintain the internal pressure at 8 kg/cm²G to proceed with polymerization at 80° C. for one hour.

After the completion of polymerization, the reactor was opened and the resultant polymer slurry was poured in 2 liter of mixed liquid of methanol and hydrochloric acid. The polymer was filtered off, washed with methanol and dried at 80° C. under reduced pressure for 4 hours.

As the result, there was obtained 9.5 g of polymer powder with favorable fluidity at a polymerization activity of 69 kg/g-Zr.

EXAMPLE 7

Ethylene was copolymerized with 1-octene.

A one (1) liter dry polymerization reactor equipped with a stirrer the inside of which had been purged with dry nitrogen was charged with 370 ml of dry heptane and further with 30 ml of 1-octene, 1.3 ml of solution of methylaluminoxane in toluene (1.9 mmol/liter) and 0.0015 mmol of the solid catalyst component as prepared in Example 1 (2) expressed in terms of zirconium. Immediately thereafter, the reaction system was heated to raise the temperature up to 60° C. and pressurized with ethylene so as to maintain the internal pressure in the polymerization reactor at 8 kg/cm²G, and ethylene was further introduced therein so as to maintain the internal pressure at 8 kg/cm²G to proceed with polymerization at 60° C. for one hour.

After the completion of polymerization, the reactor was opened and the resultant polymer slurry was poured in 2 liter of mixed liquid of methanol and hydrochloric acid. The polymer was filtered off, washed with methanol and dried at 80° C. under reduced pressure for 4 hours.

As the result, there was obtained 25.4 g of polymer powder with favorable fluidity at a polymerization activity of 186 kg/g-Zr, which polymer had a density of 0.925 g/ml, 1-octene unit content of 4% by weight, a weight-average molecular weight (Mw) of 140,000 and a ratio of weight-average molecular weight (Mw) to number-average molecular weight (Mn)(Mw/Mn) of 2.7.

EXAMPLE 8

(1) Preparation of Solid Catalyst

To 32 ml of toluene were added 1.0 ml of 1.0 mole/liter solution of triisobutylaluminum in toluene, 10.7 ml of 1.9 mole/liter solution of methylaluminoxane in toluene and 7.6 ml of 13 mmol/liter solution of bis(cyclopentadienyl) zirconium dichloride in toluene with stirring for 20 minutes. To the resultant mixture was further added 50 ml of the dispersion liquid (1.0 mole/liter) of the solid product which was obtained in Example 1 (1) in toluene as the dispersant with further stirring for 2 hours. The toluene contained in the slurry thus obtained was distilled away and 100 ml of hexane was added to the remaining slurry to prepare solid catalyst slurry.

(2) Polymerization of Ethylene

A one (1) liter dry polymerization reactor equipped with a stirrer the inside of which had been purged with dry nitrogen was charged with 400 ml of dry heptane and further with 1.3 ml of solution of methylaluminoxane in toluene (1.9 mmol/liter) and 2.0 ml of the solid catalyst slurry as prepared in the preceding item (1)(2 micromol of Zr). Immediately thereafter the reaction system was heated to raise the temperature up to 80° C. and pressurized with ethylene so as to maintain the total internal pressure in the polymerization reactor at 8 kg/cm²G to proceed with polymerization a 80° C. for one hour.

After the completion of polymerization, the reactor was immediately depressurized and charged with methanol to arrest polymerization, and the resultant polymer slurry was poured in a large amount of mixed liquid of methanol and hydrochloric acid for deashing. The polymer was filtered off and dried at 80° C. under reduced pressure for 4 hours.

As the result, there was obtained 31.9 g of polymer granule. Table 1 gives the polymerization activity, apparent bulk density [η] and Mw/Mn.

EXAMPLE 9

(1) Preparation of Solid Catalyst

The procedure in Example 8 (1) was repeated to prepare solid catalyst slurry except that 1.0 ml of 1.0 mole/liter solution of triisobutylaluminum in toluene was not incorporated.

(2) Polymerization of Ethylene

The procedure in Example 8 was repeated to polymerize ethylene except that the solid catalyst slurry as prepared in the preceding item (1) was used. The results are given in Table 1.

COMPARATIVE EXAMPLE 3

The procedure in Example 8 was repeated to polymerize ethylene except that the preparation of the solid catalyst slurry was omitted and there were used bis (cyclopentadienyl)zirconium dichloride in an amount of 0.5 micromol as Zr and 1.3 ml of 1.9 mole/liter solution of methylaluminoxane in toluene at the time of polymerization. The results are given in Table 1. After the polymerization there was observed the polymer which adhered to the agitation impellers and the walls of the reactor.

EXAMPLE 10

(1) Polymerization of Ethylene

The procedure in Example 8 was repeated to polymerize ethylene except that hydrogen was introduced in the reaction system so as to attain 0.10 kg/cm$^2$G. The results are given in Table 1.

COMPARATIVE EXAMPLE 4

The procedure in Example 10 was repeated to polymerize ethylene except that the preparation of the solid catalyst slurry was omitted and there were used bis(cyclopentadienyl)zirconium dichloride in an amount of 1.0 micromol as Zr and 1.3 ml of 1.9 mole/liter solution of methylaluminoxane in toluene at the time of polymerization. The results are given in Table 1.

EXAMPLE 11

(1) Preparation of Solid Catalyst

The procedure in Example 8 was repeated to prepare solid catalyst slurry except that 6.7 ml of 15 mmol/liter solution of cyclopentadienylzirconium trichloride in toluene was used in place of 7.6 ml of 13 mmol/liter solution of bis(cyclopentadienyl)zirconium dichloride in toluene.

(2) Polymerization of Ethylene

The procedure in Example 8 was repeated to polymerize ethylene except that there was used 10.0 ml of the solid catalyst slurry (10 micromol as Zr) as prepared in the preceding item (1). The results are given in Table 1.

EXAMPLE 12

(1) Preparation of Solid Catalyst

The procedure in Example 11 (1) was repeated to prepare solid catalyst slurry except that 1.0 ml of 1.0 mol/liter solution of triisobutylaluminum in toluene was not incorporated.

(2) Polymerization of Ethylene

The procedure in Example 11 was repeated to polymerize ethylene except that the solid catalyst slurry as prepared in the preceding item (1) was used. The results are given in Table 1.

EXAMPLE 13

The procedure in Example 11 was repeated to polymerize ethylene except that hydrogen was introduced in the reaction system so as to attain 0.10 kg/cm$^2$G. The results are given in Table 1.

COMPARATIVE EXAMPLE 5

The procedure in Example 10 was repeated to polymerize ethylene except that the preparation of the solid catalyst slurry was omitted and there were used cyclopentadienylzirconium trichloride in an amount of 3.0 micromol as Zr and 1.3 ml of 1.9 mole/liter solution of methylaluminoxane in toluene at the time of polymerization. The results are given in Table 1.

TABLE 1

| | Polymer yield (g) | Polymerization activity (kg/g-Zr) | Bulk density (g/ml) | [η] (dl/g) |
|---|---|---|---|---|
| Example 8 | 31.9 | 175 | 0.08 | 3.8 |
| Example 9 | 24.1 | 132 | 0.06 | 3.3 |
| Comparative Example 3 | 21.8 | 478 | 0.03 | 3.9 |
| Example 10 | 15.1 | 83 | 0.18 | 1.0 |
| Comparative Example 4 | 29.6 | 325 | not measurable | 0.9 |
| Example 11 | 34.5 | 38 | 0.06 | 4.2 |
| Example 12 | 19.2 | 21 | 0.06 | 3.8 |
| Example 13 | 22.8 | 25 | 0.15 | 1.1 |
| Comparative Example 5 | 18.1 | 66 | not measurable | 1.0 |

| | Mw/Mn | Remarks |
|---|---|---|
| Example 8 | 2.5 | |
| Example 9 | 2.6 | |
| Comparative Example 3 | 2.6 | adhesion of polymer to agitation impellers, etc. |
| Example 10 | 4.5 | |
| Comparative Example 4 | 2.6 | agglomerate polymer |
| Example 11 | 2.5 | |
| Example 12 | 2.6 | |
| Example 13 | 4.8 | |
| Comparative Example 5 | 2.5 | agglomerate polymer |

EXAMPLE 14

(1) Preparation of Solid Catalyst

To 129 ml of toluene were added 3 ml of 0.1 mole/liter solution of tetra-n-butoxytitanium in hexane and 15 ml of 1.0 mole/liter dispersion liquid of the above-mentioned methylaluminoxane in hexane with stirring for one (1) hour. To the resultant mixture was further added 34.3 ml of the dispersion liquid (100 g/liter) of the solid product which was obtained in Example 1 (1) in hexane as the dispersant with further stirring for one (1) hour. The slurry thus obtained was washed three times each with 400 ml of hexane and diluted with hexane to a total volume of 150 ml to prepare solid catalyst slurry, which had a titanium concentration of 1.9 mmol-Ti/liter. No titanium component was detected in the supernatant hexane of the slurry.

(2) Polymerization of Ethylene

A one (1) liter dry polymerization reactor equipped with a stirrer the inside of which had been purged with dry nitrogen was charged with 400 ml of dry n-hexane, and the mixture was heated to raise the temperature to 60° C. Subsequently 21.0 ml (40 micromol of Ti) of the solid catalyst slurry as prepared in the preceding item (1) was placed in the polymerization reactor, immediately followed by raising the temperature of the mixture in the reactor to 80° C. Then ethylene was introduced into the reactor to carry out polymerization at 80° C. for one (1) hour so as to maintain the total internal pressure in the polymerization reactor at 8 kg/cm$^2$G.

After the completion of polymerization, the reactor was immediately depressurized and charged with methanol to arrest polymerization, and the content in the reactor was poured in a large amount of mixed liquid of methanol and hydrochloric acid. The polymer was filtered off, and dried at 80° C. under reduced pressure for 4 hours. There was not observed any polymer adhesion to the reactor.

As the result, there was obtained 5.6 g of polyethylene powder in particulate form having a [η] of 35 dl/g.

EXAMPLE 15

A one (1) liter dry polymerization reactor equipped with a stirrer the inside of which had been purged with dry nitrogen was charged with 400 ml of dry n-hexane and 1.0 ml of 1.0 mol/liter solution of triisobutylaluminum in hexane, and the resultant mixture was heated to raise the temperature up to 60° C.

Then, by the use of the solid catalyst slurry as prepared in Example 14 (1), ethylene was polymerized in the same manner as in Example 14. There was not observed any polymer adhesion to the walls of the reactor.

As the result, there was obtained 7.0 g of polyethylene powder in particulate form having a [η] of 39 dl/g.

COMPARATIVE EXAMPLE 6

(1) Preparation of Mixed Liquid of Catalyst Components

To 132 ml of toluene were added 3 ml of 0.1 mol/liter solution of tetra-n-butoxytitanium in hexane and 15 ml of 1.0 mol/liter dispersion liquid of the above-mentioned methylaluminoxane in hexane as the dispersant, with stirring for one (1) hour.

(2) Polymerization of Ethylene

A one (1) liter dry polymerization reactor equipped with a stirrer the inside of which had been purged with dry nitrogen was charged with 400 ml of dry n-hexane and 1.0 ml of 1.0 mole/liter of triisobutylaluminum in hexane followed by raising the temperature of the mixture in the reactor to 60° C. Subsequently 20.0 ml (40 micromol of Ti) of the mixed liquid of the catalyst component as prepared in the preceding item (1) was placed in the polymerization reactor. Immediately thereafter the reaction system was heated to raise the temperature up to 80° C. and pressurized with ethylene so as to maintain the total internal pressure in the polymerization reactor at 8 kg/cm$^2$G to proceed with polymerization at 80° C. for one hour.

After the completion of polymerization, the reactor was immediately depressurized and charged with methanol to arrest polymerization.

As the result, there was obtained 8.0 g of agglomerate polymer which adhered to the agitation impellers and the walls of the reactor.

EXAMPLE 16

(1) Preparation of Solid Catalyst

To 126 ml of toluene were added 3.0 ml of 1.0 mole/liter solution of triisobutylaluminum in hexane and 3 ml of 0.1 mole/liter solution of tetra-n-butoxytitanium in hexane with stirring for 10 minutes, and then 15 ml of 1.0 mole/liter dispersion liquid of the above-mentioned methylaluminoxane in hexane as the dispersant with stirring for one (1) hour. To the resultant mixture was further added 34.3 mmol of the dispersion liquid (100 g/liter) of the solid product which was obtained in Example 1 (1) in hexane as the dispersant with further stirring for one (1) hour. The slurry thus obtained was washed three times each with 400 ml of hexane and diluted with hexane to a total volume of 150 ml to prepare solid catalyst slurry, which had a titanium concentration of 1.6 mmol-Ti/liter. No titanium component was detected in the supernatant hexane of the slurry.

(2) Polymerization of Ethylene

The procedure in Example 15 was repeated except the use of 25.0 ml (40 micromol of Ti) of the solid catalyst slurry as prepared in the preceding item (1).

There was not observed any polymer adhesion to the reactor.

As a result, there was obtained 43.6 g of polyethylene powder in particulate form having a [η] of 46 dl/g a bulk density of 0.13 g/ml.

EXAMPLE 17

(1) Copolymerization of Ethylene and 1-octene

A one (1) liter dry polymerization reactor equipped with a stirrer the inside of which had been purged with dry nitrogen was charged with 360 ml of dry n-hexane, 40 ml of 1-octene and 1.0 ml of 1.0 mol/liter of triisobutylaluminum in hexane, followed by raising the temperature of the mixture in the reactor to 60° C. Subsequently, 25.0 ml (40 micromol of Ti) of the solid catalyst slurry as prepared in Example 16 (1) was placed in the polymerization reactor. Immediately thereafter, the reaction system was heated to raise the temperature up to 80° C. and pressurized with ethylene so as to maintain the total internal pressure in the polymerization reactor at 8 kg/cm$^2$G, to proceed with polymerization at 80° C. for one hour.

After the completion of polymerization, the reactor was immediately depressurized and charged with methanol to arrest polymerization.

There was not observed any polymer adhesion to the reactor.

As a result, there was obtained 42.9 g of ethylene/octene copolymer in particulate form having a [η] of 41 dl/g, a bulk density of 0.15 g/ml, 1-octene unit content of 0.5 mole % and a melting point of 127° C.

COMPARATIVE EXAMPLE 7

(1) Preparation of Mixed Liquid of Catalyst Components

To 129 ml of toluene were added 3.0 ml of 1.0 mole/liter solution of triisobutylaluminum in hexane and 3 ml of 0.1 mole/liter solution of tetra-n-butoxytitanium in hexane with stirring for 10 minutes, and then 15 ml of 1.0 mole/liter dispersion liquid of the above-mentioned methylaluminoxane in hexane as the dispersant with stirring for one (1) hour.

(2) Copolylmerization of Ethylene and 1-octene

The procedure in Example 17 was repeated except the use of 20.0 ml (40 micromol of Ti) of the mixed liquid of catalyst components as prepared in the preceding item (1).

However, after an elapse of 30 minutes from the start of the polymerization, the polymerization was discontinued because of impossibility of the temperature control. On opening the polymerization reactor, there was observed 35.2 g of agglomerate polymer which adhered to the walls and impellers of the reactor.

INDUSTRIAL APPLICABILITY

As described hereinbefore, the present invention enables to contrive to improve the powder morphology of the produced polymer and facilitate the regulation of the molecular weight distribution thereof and besides to efficiently and stably produce a high molecular weight polyolefin having excellent particle shape with minimized adhesion of the resultant polymer to the polymerization reactor.

Thus, the process according to the present invention is preferably applicable to the production of ethylenic polymers such as polyolefin, especially low-density linear polyolefin, thereby rendering itself extremely valuable in utilization.

What is claimed is:

1. A process for producing a polyolefin which comprises polymerizing an olefin in the presence of $10^{-8}$ to $10^{-2}$ mole in terms of the atoms $M^2$ per liter of polymerization solvent of a catalyst consisting essentially of:
  (A) a transition metal compound having a group with conjugated π electrons as a ligand, said transition metal compound having the formula (III), (IV) or (V)

$CpM^2R^5_eR^6_fR^7_g$          (III)

$Cp_2M^2R^5_eR^6_f$          (IV)

$(Cp-A_h-Cp)M^2R^5_eR^6_r$          (V)

wherein $M^2$ is a transition metal belonging to the group IVB of the Periodic Table of Elements,
  Cp is an unsaturated cyclic hydrocarbon radical or an unsaturated chain hydrocarbon radical,
  $R^5$, $R^6$ and $R^7$, independently, are each a σ-bonding ligand selected from the group consisting of a hydrogen atom, a halogen atom, an alkyl group having 1 to 20 carbon atoms, an alkoxy group having 1 to 20 carbon atoms, an aryl group, an alkylaryl group, an arylalkyl group each having 6 to 20 carbon atoms, an acyloxy group having 1 to 20 carbon atoms and an allyl group, a acetylacetonato chelating ligand or Lewis base selected from the group consisting of ethers, thioethers, esters, nitrites, amines, phosphine, unsaturated chain hydrocarbons and unsaturated cyclic hydrocarbons,
  A is a group covalently bonding the Cp groups,
  e, f and g, independently, are an integer of from 0 to 4, and h is an integer from 0 to 6, wherein two of $R^5$, $R^6$ and $R^7$ may together form a ring:
  (B) an aluminoxane having formula (VII),

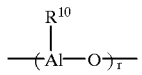        (VII)

wherein $R^{10}$ is a hydrocarbon radical having 1 to 8 carbon atoms and r is an integer from 2 to 100, or having formula (VIII)

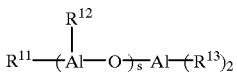        (VIII)

wherein $R^{11}$, $R^{12}$ and $R^{13}$, independently of one another, are each a hydrocarbon radical having 1–8 carbon atoms and s is an integer from 2 to 100; and
  (C) a magnesium compound represented by the formula $Mg(OR)_nX^1_{2-n}$ wherein R is an alkyl group, a cycloalkyl group, an aryl group or an aralkyl group, $X^1$ is a halogen atom, and n is a number from 1 to 2,
  wherein the amount of catalyst component (A) is $10^{-4}$ to $10^{-1}$ mole per mole of catalyst component (C) and
  wherein said magnesium compound is prepared by reacting an alcohol having 1–6 carbon atoms, metallic magnesium, and a halogen selected from the group consisting of chlorine, bromine and iodine, wherein said magnesium compound is prepared by mixing 2–100 moles of said alcohol per mole of said magnesium at least 0.0001 g-atom of said halogen per mole of said magnesium, and heating the resulting mixture until the generation of hydrogen gas is no longer observed.

2. The process of claim 1, wherein said olefin is ethylene, an α-olefin having 3–18 carbon atoms, a cyclic olefin having 4–8 carbon atoms or a mixture of ethylene and said α-olefin, said olefin is solution polymerized at a pressure of 0–150 kg/cm²G in the presence of $10^{-8}$ to $10^{-2}$ mole of said catalyst/liter of solution, said transition metal compound contains zirconium, titanium or hafnium, said Cp is a cyclopentadienyl, indenyl, tetrahydroindenyl, fluorenyl, methylcyclopentadienyl, ethylcyclopentadienyl, isopropylcyclopentadienyl, 1,2-dimethylcyclopentadienyl, tetramethylcyclopentadienyl, 1,3-dimethylcyclopentadienyl, 1,2,3-trimethylcyclopentadienyl, 1,2,4-trimethylcyclopentadienyl, pentamethylcyclopentadienyl or trimethylsilylcyclopentadienyl group, said catalyst is prepared by mixing said catalyst components (A), (B) and (C) wherein the amount of said catalyst component (A) is $10^{-4}$ to $10^{-1}$ mole per mole of catalyst component (C), and the amount of catalyst component (B) is $1-10^6$ moles per mole of catalyst component (A) expressed in terms of aluminum atoms.

3. The process of claim 2, wherein said magnesium compound is dimethoxymagnesium, diethoxymagnesium, di-n-propoxymagnesium, diphenoxymagnesium, dibenzyloxymagnesium, ethoxyphenoxymagnesium, chloromethoxymagnesium or chloroethoxymagnesium; said transition metal compound is bis(cyclopentadienyl) zirconium dichloride; said aluminoxane is methylaluminoxane; and said olefin is ethylene.

4. The method of claim 1, wherein said catalyst consists of said transition metal compound, said aluminoxane and said magnesium compound.

5. A process for producing a polyolefin which comprises polymerizing an olefin in the presence of $10^{-8}$ to $10^{-2}$ mole in terms of the atoms $M^2$ per liter of polymer solvent of a catalyst consisting essentially of:
  (A) a transition metal compound having a group with conjugated π electrons as a ligand, said transition metal compound having formula (III), (IV) or (V)

$CpM^2R^5_eR^6_fR^7_g$          (III)

$Cp_2M^2R^5_eR^6_f$          (IV)

$(Cp-A_h-Cp)M^2R^5_eR^6_f$          (V)

wherein $M^2$ is a transition metal belonging to the group IVB of the Periodic Table of Elements,
  Cp is an unsaturated cyclic hydrocarbon radical or an unsaturated chain hydrocarbon radical,
  $R^5$, $R^7$ and $R^7$, independently, are each a σ-bonding ligand selected from the group consisting of a hydrogen atom, a halogen atom, an alkyl group having 1 to 20 carbon atoms, an alkoxy group having 1 to 20 carbon atoms, an aryl group, an alkylaryl group, an arylalkyl group each having 6 to 20 carbon atoms, an acyloxy group having 1 to 20 carbon atoms and an allyl group, a acetylacetonato chelating ligand or Lewis base selected from the group consisting of ethers, thioethers, esters, nitrites, amines, phosphine, unsaturated chain hydrocarbons and unsaturated cyclic hydrocarbons,
  A is a group covalently bonding the Cp groups,
  e, f and g, independently, are an integer of from 0 to 4, and h is an integer from 0 to 6, wherein two of $R^5$, $R^6$ and $R^7$ may together from a ring:

(B) an aluminoxane having formula (VII),

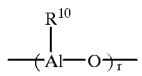
(VII)

wherein $R^{10}$ is a hydrocarbon radical having 1 to 8 carbon atoms and r is an integer from 2 to 100, or having formula (VIII)

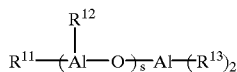
(VIII)

wherein $R^{11}$, $R^{12}$ and $R^{13}$, independently of one another, are each a hydrocarbon radical having 1–8 carbon atoms and s is an integer from 2 to 100; and (C) a magnesium compound represented by the formula $$Mg(OR)_n X^1_{2-n}$$

wherein R is an alkyl group, a cycloalkyl group, an aryl group or an aralkyl group, $X^1$ is a halogen atom, and n is a number from 1 to 2; and (D) an organoaluminum compound having formula (X)

(X)

wherein $R^{15}$, $R^{16}$ and $R^{17}$ independently, are each an alkyl group having 1 to 2 carbon atoms, wherein the amount of catalyst component (A) is $10^{-4}$ to $10^{-1}$ mole per mole of catalyst component (C), and wherein said magnesium compound is prepared by reacting an alcohol having 1–6 carbon atoms, metallic magnesium, and a halogen selected from the group consisting of chlorine, bromine, and iodine, wherein said magnesium compound is prepared by mixing 2–100 moles of said alcohol per mole of said magnesium and heating the resulting mixture until the generation of hydrogen gas is no longer observed.

6. The process of claim 5, wherein said olefin is ethylene, an α-olefin having 3–18 carbon atoms, a cyclic olefin having 4–8 carbon atoms or a mixture of ethylene and said α-olefin, said olefin is solution polymerized at a pressure of 0–150 kg/cm$^2$G in the presence of $10^{-8}$ to $10^{-2}$ mole of said catalyst/liter of solution, said transition metal compound contains zirconium, titanium or hafnium, said Cp is a cyclopentadienyl, indenyl, tetrahydroindenyl, fluorenyl, methylcyclopentadienyl, ethylcyclopentadienyl, isopropylcyclopentadienyl, 1,2-dimethylcyclopentadienyl, tetramethylcyclopentadienyl, 1,3-dimethylcyclopentadienyl, 1,2,3-trimethylcyclopentadienyl, 1,2,4-trimethylcyclopentadienyl, pentamethylcyclopentadienyl or trimethylsilylcyclopentadienyl group, said catalyst is prepared by mixing said catalyst components (A), (B) and (C) wherein the amount of said catalyst component (A) is $10^{-4}$ to $10^{-1}$ mole per mole of catalyst component (C), the amount of catalyst component (B) is 1–$10^6$ moles per mole of catalyst component (A) expressed in terms of aluminum atoms, and the amount of catalyst component (D) is $10^{-1}$ to $10^5$ moles per mole of catalyst component (A).

7. The method of claim 6, wherein said magnesium compound is dimethoxymagnesium, diethoxymagnesium, di-n-propoxymagnesium, diphenoxymagnesium, dibenzyloxymagnesium, ethoxyphenoxymagnesium, chloromethoxymagnesium or chloroethoxymagnesium; said transition metal compound is bis (cyclopentadienyl) zirconium dichloride; said aluminoxane is methylaluminoxane; said olefin is ethylene; and said organoaluminum compound is selected from the group consisting of trimethylaluminum, triethylaluminum, tri-isobutyl aluminum, tri-n-butylaluminum, tri-n-hexylaluminum, tri-n-octyl aluminum, and tri-isopropyl aluminum.

8. The process of claim 5, wherein said catalyst consists of said transition metal compound, said aluminoxane, said magnesium compound and said organoaluminum compound.

9. The process according to claim 1 or 5 wherein hydrogen is added in the reaction system at the time of the polymerization reaction.

10. The process according to claim 1 or 5 wherein the polyolefin is an ethylenic polymer.

* * * * *